United States Patent [19]
Mizobe

[11] Patent Number: 6,079,294
[45] Date of Patent: Jun. 27, 2000

[54] BICYCLE CRANK AND METHOD FOR MANUFACTURING SAME

[75] Inventor: Eiji Mizobe, Sakai, Japan

[73] Assignee: Shimano, Inc., Osaka, Japan

[21] Appl. No.: 08/994,514

[22] Filed: Dec. 19, 1997

[30] Foreign Application Priority Data

Dec. 27, 1996 [JP] Japan ................................. 8-358089

[51] Int. Cl.⁷ .................................................... B62M 3/00
[52] U.S. Cl. ............................................................ 74/594.1
[58] Field of Search ................... 74/594.1, 545, 74/579 R

[56] References Cited

U.S. PATENT DOCUMENTS

| | | | |
|---|---|---|---|
| 3,106,853 | 10/1963 | Herr et al. | 74/545 |
| 4,811,626 | 3/1989 | Bezin | 74/594.1 |
| 5,125,288 | 6/1992 | Amiet | 74/594.1 |
| 5,179,873 | 1/1993 | Girvin | 74/594.1 |
| 5,197,353 | 3/1993 | Trenerry et al. | 74/594.1 |
| 5,394,769 | 3/1995 | Cropley | 74/545 |
| 5,509,327 | 4/1996 | Cropley | 74/545 |
| 5,609,070 | 3/1997 | Lin et al. | 74/594.1 |

FOREIGN PATENT DOCUMENTS

| | | | |
|---|---|---|---|
| 270388 A1 | 6/1988 | European Pat. Off. | |
| 51260 | 2/1942 | France | 74/594.1 |
| 981379 | 5/1951 | France | 74/594.1 |
| 1230096 | 9/1960 | France | 74/545 |
| 48-7948 | 1/1973 | Japan . | |
| 58-93554 | 6/1983 | Japan . | |
| 60-137691 | 9/1985 | Japan . | |
| 61-131391 | 8/1986 | Japan . | |
| 61-150691 | 9/1986 | Japan . | |
| 2-18652 | 4/1990 | Japan . | |
| 5-116670 | 5/1993 | Japan . | |

OTHER PUBLICATIONS

Patent Abstracts of Japan, vol. 7, No. 193, Aug. 24, 1983; for JP 58–093554 A (Arai), published Jun. 3, 1983.

*Primary Examiner*—Mary Ann Battista
*Attorney, Agent, or Firm*—James A. Deland

[57] ABSTRACT

A crank arm for a bicycle includes a crank arm body formed of a first material and a core formed of a second material disposed in the crank arm body. The second material has a specific gravity less than a specific gravity of the first material. The second material may be a porous material such as volcanic glass or some other lightweight material. In the method used to form the crank arm body, a core having a specific gravity lower than a specific gravity of the metal forming the outer portions of the crank arm is positioned in a casting mold so that a melt space is formed around the core. Molten metal is poured into the casting mold, and the molten metal is solidified to form a crank billet such that the core is integrally formed with the metal.

21 Claims, 5 Drawing Sheets

6,079,294

BICYCLE CRANK AND METHOD FOR MANUFACTURING SAME

BACKGROUND OF THE INVENTION

The present invention is directed to bicycle crank arms and, more particularly, to a bicycle crank arm that includes a central core formed of a material different than the material forming the outer portions of the crank arm.

It is desirable for a bicycle to be as lightweight as possible, so the bicycle parts should be reduced in weight as much as possible. This is true of bicycle cranks as well. A bicycle crank that is made lightweight by being manufactured in the form of a hollow tube is known from Japanese Patent Publication 2-18652, for example. Furthermore, a method for forming an internal cavity in a solid material by extrusion forging has also been proposed in Japanese Laid-Open Patent Application 5-116670. This hollow crank is obtained by the welding or plastic deformation of a pipe or crank billet, but this method affords little freedom in the design of the crank shape. The shape is further restricted because molding is impossible without certain portions that are otherwise unnecessary in terms of material dynamics, among other reasons. Another drawback is that a high quality appearance is difficult to achieve because of limitations in the machining process, despite demand for certain types of designs.

Methods for manufacturing a bicycle crank from a light alloy by casting are also known from Japanese Laid-Open Patent Application 58-93554. The shape restrictions noted above are eliminated with these casting methods, but forming a cavity on the inside is difficult with a crank because of the small size of the part, and the hollow interior can degrade the mechanical strength of the product. Accordingly, it has been proposed that a pipe or the like be integrally cast in the interior as shown in Japanese Laid-Open Utility Model Applications 48-7948 and 61-131391. Integrally embedding a pipe or other such member with high strength in the crank does indeed preserve the strength of the crank, but a problem remains in terms of making the product lightweight.

SUMMARY OF THE INVENTION

The present invention is directed to a bicycle crank that can be manufactured by casting while providing substantial design freedom. Such a crank can be lightweight while also being strong. In one embodiment of a bicycle crank according to the present invention, a crank arm for a bicycle includes a crank arm body formed of a first material and a core formed of a second material disposed in the crank arm body. The second material has a specific gravity less than a specific gravity of the first material. The second material may be a porous material such as volcanic glass or some other lightweight material.

In one embodiment of the method used to form the crank arm body according to the present invention, a core having a specific gravity lower than a specific gravity of the metal forming the outer portions of the crank arm is positioned in a casting mold so that a melt space is formed around the core. Molten metal is poured into the casting mold, and the molten metal is solidified to form a crank billet such that the core is integrally formed with the metal.

BRIEF DESCRIPTION OF THE DRAWINGS

FIG. 5($b$) is a view taken along line Vb—Vb in FIG. 4;

FIG. 5($c$) is a view taken along line Vc—Vc in FIG. 4;

FIG. 5($d$) is a view taken along line Vd—Vd in FIG. 4;

DETAILED DESCRIPTION OF THE EMBODIMENTS

Figure 1:
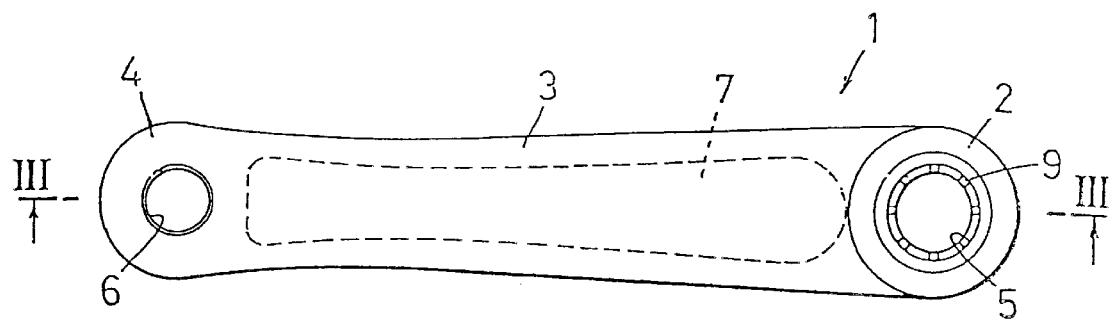
FIG. 1 is a rear view of a particular embodiment of a bicycle crank according to the present invention.
Figure 2:
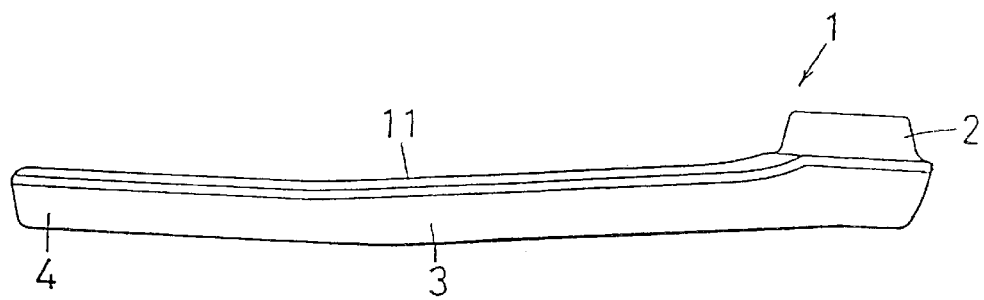
FIG. 2 is a side view of the bicycle crank shown in FIG. 1.

FIG. 1 is a rear view of a particular embodiment of a left side bicycle crank 1 according to the present invention. The left crank 1 is made from an aluminum alloy and, as shown in FIG. 1, is formed such that its cross section is narrower on the pedal spindle end 4 side where the pedal spindle (not shown) is attached and thicker on the crank spindle end 2 side where the crank spindle (not shown) is attached. Thus changing the cross sectional area by varying the thickness of the left crank 1 in different locations is intended to enhance strength such that the stress to which the left crank is subjected is more or less the same everywhere in the cross section. A chamfered section 11 (see FIG. 2) is formed along both edges on the back side of the left crank 1.

A pedal attachment hole 6 for attachment of a pedal spindle (not shown) is formed in the pedal spindle end 4 on the pedal attachment side of the left crank 1. A crank spindle attachment hole 5 for attaching the left crank 1 to the crank spindle by inserting the spindle into the crank spindle attachment hole 5 is formed at the crank spindle end 2 of the left crank 1. More specifically, a flange 8 protrudes inward from the inner surface of the crank spindle attachment hole 5, and a male serration 9 is provided integrally on the rear surface side of this flange 8. In this example, the serration 9 has eight teeth, as shown in FIG. 1. If there are too few teeth, the strength of the rotational bond will be inadequate. On the other hand, if there are too many teeth the machining will be difficult, the cost will be higher, and there will be a higher incidence of errors in the positioning of indexing in the rotational direction during assembly.

The portion of the crank spindle attachment hole 5 to the rear of the serration 9 is structured as a centering component (also called a guide component) 10 that is a concentrically tapered hole. The centering component 10 is in the form of a cylindrical tapered hole that widens to the rear, and, in this example, it is formed at a taper angle of 2° to 3°. The taper surface of the centering component 10 is snugged up against the taper surface of the centering component of the crank spindle (not shown), which accurately aligns the two centers and also links them together integrally and securely.

Figure 3:
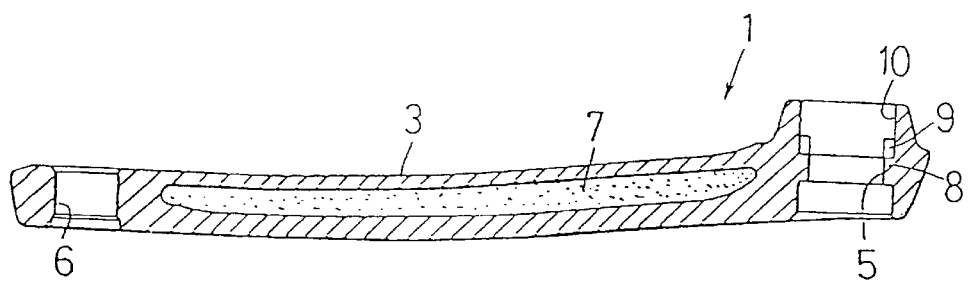
FIG. 3 is a cross sectional view of the bicycle crank taken along line III—III in FIG. 1.
Figure 4:
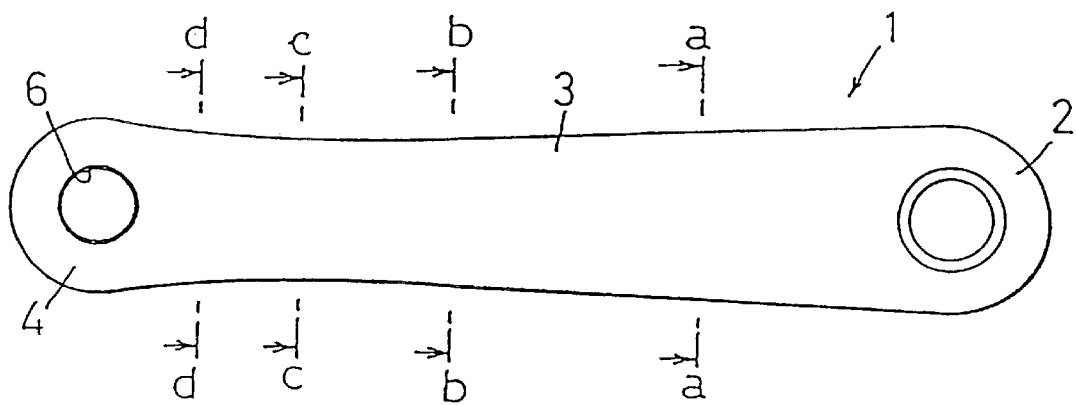
FIG. 4 is a front view of the bicycle crank shown in FIG. 1.
Figure 5A:
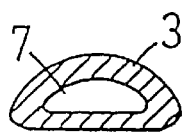
FIG. 5($a$) is a view taken along line Va—Va in FIG. 4.
Figure 5B:
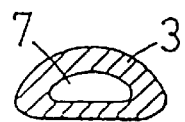
Figure 5C:
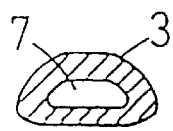
Figure 5D:
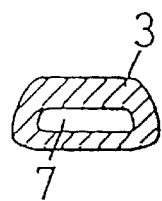

As shown in FIGS. 1, 3 and 5($a$)–($d$), a core 7 is formed along the pedal spindle end 4 side and the crank spindle end 2 side centering on the crank center 3, wherein the cross sectional structure of the core 7 is shown in FIGS. 5($a$)–($d$). The core 7 has a lower specific gravity than the metal that makes up the left crank 1, and it has enough compression load resistance to withstand pressing. An example of such a material is pumice. The material used in this embodiment is a hollow foam obtained by foaming volcanic glass whose principal components are silicon oxide and aluminum oxide.

As shown in FIGS. 5(*a*)–(*d*), the cross sectional structure of the core 7 is such that the shape is semicircular on the crank spindle end 2 side, and this shape flattens out to a rectangular shape on the pedal spindle end 4 side. The lower wall thickness of the crank is essentially the same along the length of core 7. The cross sectional area of the core 7 continuously decreases, and the height is at a minimum at the two ends. In other words, the shape of the core 7 approximates that of a ship hull. The weight of the left crank 1 is reduced by the core 7 on the interior of the crank center 3. The core 7 also contributes to flexural and other aspects of mechanical stress.

Method 1 for Manufacturing the Left Crank 1

Figure 6:
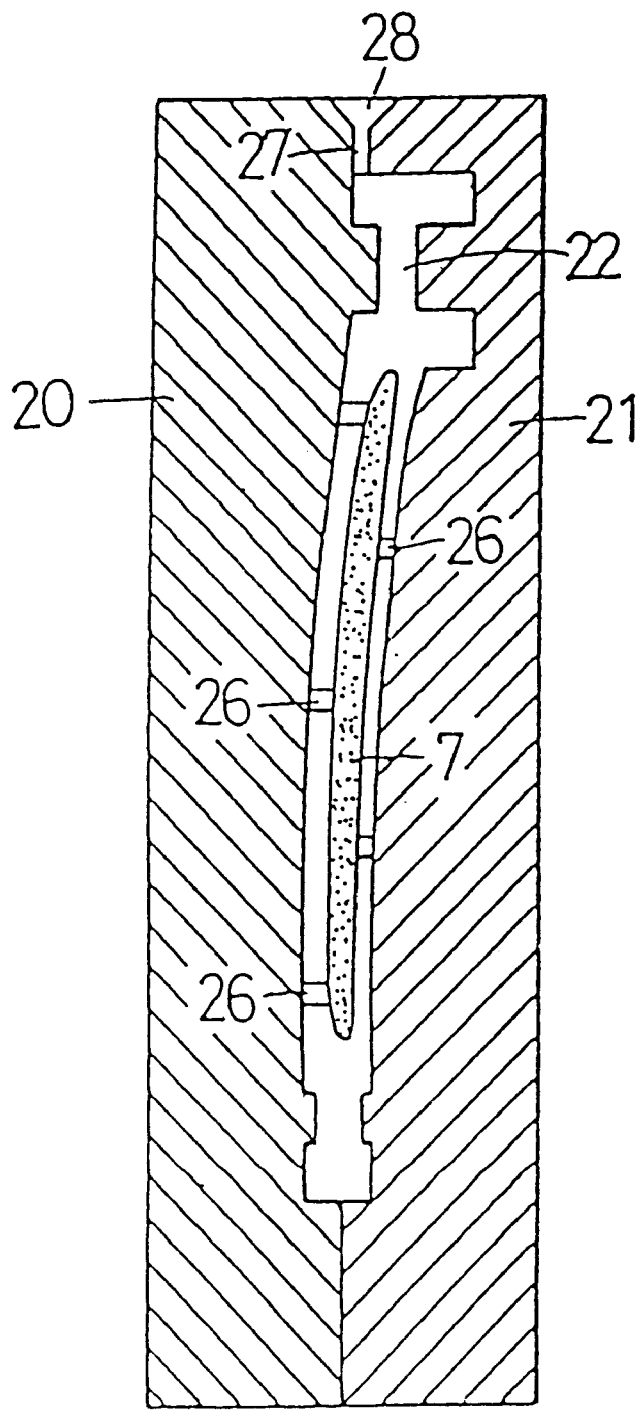
FIG. 6 is a cross sectional view of a particular embodiment of a casting mold used in the method of manufacturing a bicycle crank according to the present invention.

The left crank 1 may be manufactured by the following method. FIG. 6 is a cross sectional view of the molding apparatus during initial casting. A melt space 22, into which the molten metal is allowed to flow between the metal mold 20 and the metal mold 21, is demarcated within the metal mold 20 and the metal mold 21. The melt space 22 is demarcated in a shape roughly corresponding to the left crank 1, but the melt space 22 is slightly larger to accommodate the shrinkage of the molten metal. The core 7 is placed inside the melt space 22.

Figure 7:
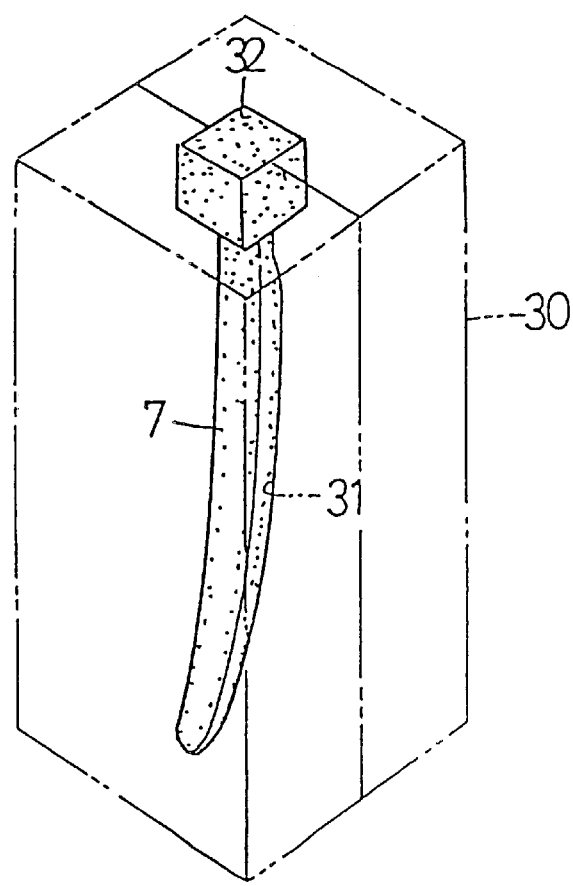
FIG. 7 is an oblique projection of a casting mold for the core used in the method of manufacturing the bicycle crank according to the present invention.

In this embodiment, the core 7 is made by baking foamed volcanic glass. The core 7 is made by baking in a mold core mold 30 shown in FIG. 7. In this embodiment, mold core mold 30 is made from a refractory material, and it is made in a mold that splits in two. On the inside of the mold core mold 30 is formed a space 31 that corresponds to the core 7 and a bung hole 32. Sand-like volcanic glass is poured into these spaces 31 and 32. The volcanic glass is tamped down at a specific pressure, after which it is put into a sintering furnace (not shown) along with the mold core mold 30, where it is heated to the hardening temperature of the volcanic glass. This heating hardens the volcanic glass within the mold core mold 30 and creates the core 7. Once the core 7 has hardened, the mold core mold 30 is split open and the core 7 is taken out from the spaces 31 and 32. The portion of core 7 formerly located within bung hole 32 is not needed and is therefore cut off.

The melt space 22 is formed within the metal mold 20 and the metal mold 21, and the core 7 is positioned within the melt space 22 as shown in FIG. 6. In order for the core 7 to be accurately positioned within the melt space 22, spacers 26 made from foamed styrene or the like are used to position the core 7. The melt space 22 communicates with a sprue 28 via a runner 27. A molten aluminum alloy is then poured into the sprue 28, goes through the runner 27, and enters the melt space 22. This casting method is called a metal mold gravity casting, in which ordinary casting is performed using only gravitational pressure without any additional pressure. After casting, the crank billet is taken out of the metal mold 20 and the metal mold 21.

Figure 8:
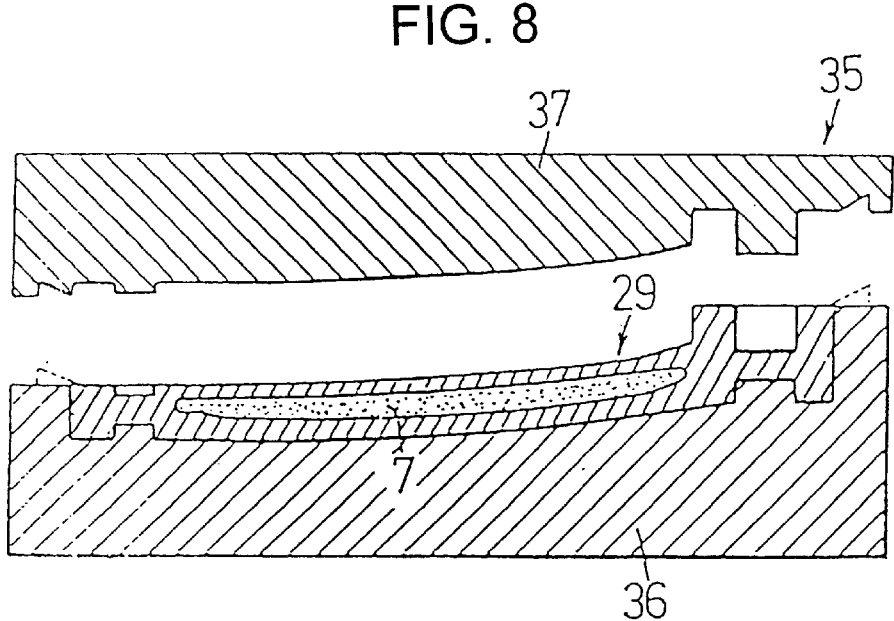
FIG. 8 is a cross sectional view of the crank billet being placed in a forging mold.
Figure 9:
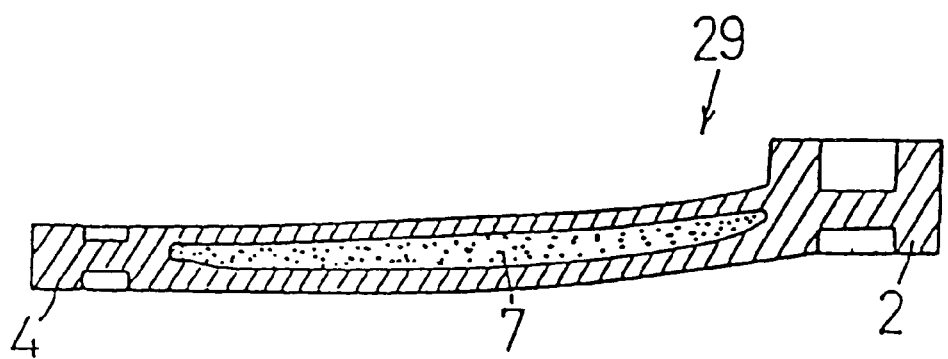
FIG. 9 is a cross sectional view of the crank billet after forging.

With casting alone, blowholes and the like can occur in the metal texture in the interior. To prevent this from occurring, the crank billet may be subjected to mold forging while the core 7 is still inside the crank billet 29. More specifically, the crank billet 29 is placed in a semi-closed metal mold 35 that is used for semi-closed forging, and is hot forged therein. FIG. 8 is a cross sectional view showing the crank billet 29 disposed in a lower metal mold 36. The crank billet 29 is heated to the required temperature and placed in the lower metal mold 36, after which pressure is applied from an upper metal mold 37 to perform forging. As a result of this hot forging, the length, overall thickness, wall thickness, and surface of the crank arm are precisely worked, the material of the crank billet 29 is tempered and homogenized, and the mechanical strength is increased.

Because the core 7 produced by this hot forging is still inside the crank billet 29 during the forging, the core 7 is not crushed. After forging, the left crank 1 is completed by being machined to the shape shown in FIGS. 1 through 4.

In this embodiment, the following was used for the core 7:

Trade name: "Terra Balloon" made by Calseed (8-2 Minami Kaigan, Itsui, Ichihara-Ichi, Chiba Prefecture)

Components (wt %): $SiO_2$ (77.3), $Al_2O_3$ (12.8), $Fe_2O_3$ (1.7), CaO (1.0), MgO (0.1), $Na_2O$ (3.2), $K_2O$ (2.9), $TiO_2$ (0.2), other (0.9)

Particle size ($\mu$m): 9.41 (10%), 27.71 (50%), 71.32 (90%)

Density: 0.30 light charge density, 0.46 heavy charge density, 1.14 particle density Heat resistance temperature (° C.): 1100

While the above is a description of various embodiments of the present invention, further modifications may be employed without departing from the spirit and scope of the present invention. For example, the size, shape, location or orientation of the various components may be changed as desired. The functions of one element may be performed by two, and vice versa. In the above embodiment, volcanic glass was used for the core, but other core materials may also be used as long as they have a lower specific gravity than the matrix metal, have heat resistance against the molten metal, and have enough compression strength to withstand forging, such as natural pumice or foamed gypsum. The foamed material may be one with independent internal spaces, or it may be a continuous foamed material in which the internal spaces are linked, as are the pores in a whetstone. These are referred to as porous materials in the present invention. Thus, the scope of the invention should not be limited by the specific structures disclosed. Instead, the true scope of the invention should be determined by the following claims.

What is claimed is:

1. A bicycle crank arm comprising:

a crank arm body formed of a first material;

wherein the crank arm body includes a continuous outer portion extending along the entire crank arm body;

wherein the crank arm body defines a pedal attachment hole on one end extending entirely through the crank arm body and a spindle attachment hole on another end extending entirely through the crank arm body; and a core disposed in the crank arm body and completely filling a cavity formed by the crank arm body, wherein the core is formed of a second material having a specific gravity less than a specific gravity of the first material.

2. The crank arm according to claim 1 wherein the second material comprises a porous material.

3. The crank arm according to claim 1 wherein the second material comprises volcanic glass.

4. The crank arm according to claim 1 wherein the core is entirely surrounded by the first material.

5. The crank arm according to claim 1 wherein the first material comprises a metal.

6. The crank arm according to claim 1 wherein a cross sectional area of the core decreases from a central portion of the crank arm to the ends of the crank arm.

7. The crank arm according to claim 1 wherein the core has a substantially semicircular cross sectional shape in proximity to the spindle attachment hole.

8. The crank arm according to claim 1 wherein the entire outer portion is formed of aluminum alloy.

9. The crank arm according to claim 1 wherein the second material comprises a granular material.

10. The crank arm according to claim 1 wherein the second material comprises a foam material.

11. The crank arm according to claim 1 wherein the core has a substantially rectangular shape in proximity to the pedal attachment hole.

12. The crank arm according to claim 11 wherein the core has a substantially semicircular cross sectional shape in proximity to the spindle attachment hole.

13. The crank arm according to claim 1 wherein the outer portion is one-piece.

14. The crank arm according to claim 13 wherein the outer portion forms a continuous outer surface of the crank arm.

15. A bicycle crank arm comprising:

a crank arm body formed of a first material;

wherein the crank arm body includes a continuous outer portion extending along the entire crank arm body;

wherein the crank arm body defines a pedal attachment hole on one end extending entirely through the crank arm body and a spindle attachment hole on another end extending entirely through the crank arm body; and a core disposed in the crank arm body, wherein the core is formed of a foam material having a specific gravity less than a specific gravity of the first material.

16. The crank arm according to claim 15 wherein the core is entirely surrounded by the first material.

17. The crank arm according to claim 15 wherein the first material comprises a metal.

18. The crank arm according to claim 15 wherein the core has a substantially semicircular cross sectional shape in proximity to the spindle attachment hole.

19. The crank arm according to claim 15 wherein a cross sectional area of the core decreases from a central portion of the crank arm to the ends of the crank arm.

20. The crank arm according to claim 15 wherein the core has a substantially rectangular shape in proximity to the pedal attachment hole.

21. The crank arm according to claim 20 wherein the core has a substantially semicircular cross sectional shape in proximity to the spindle attachment hole.

* * * * *